Patented Dec. 16, 1924.

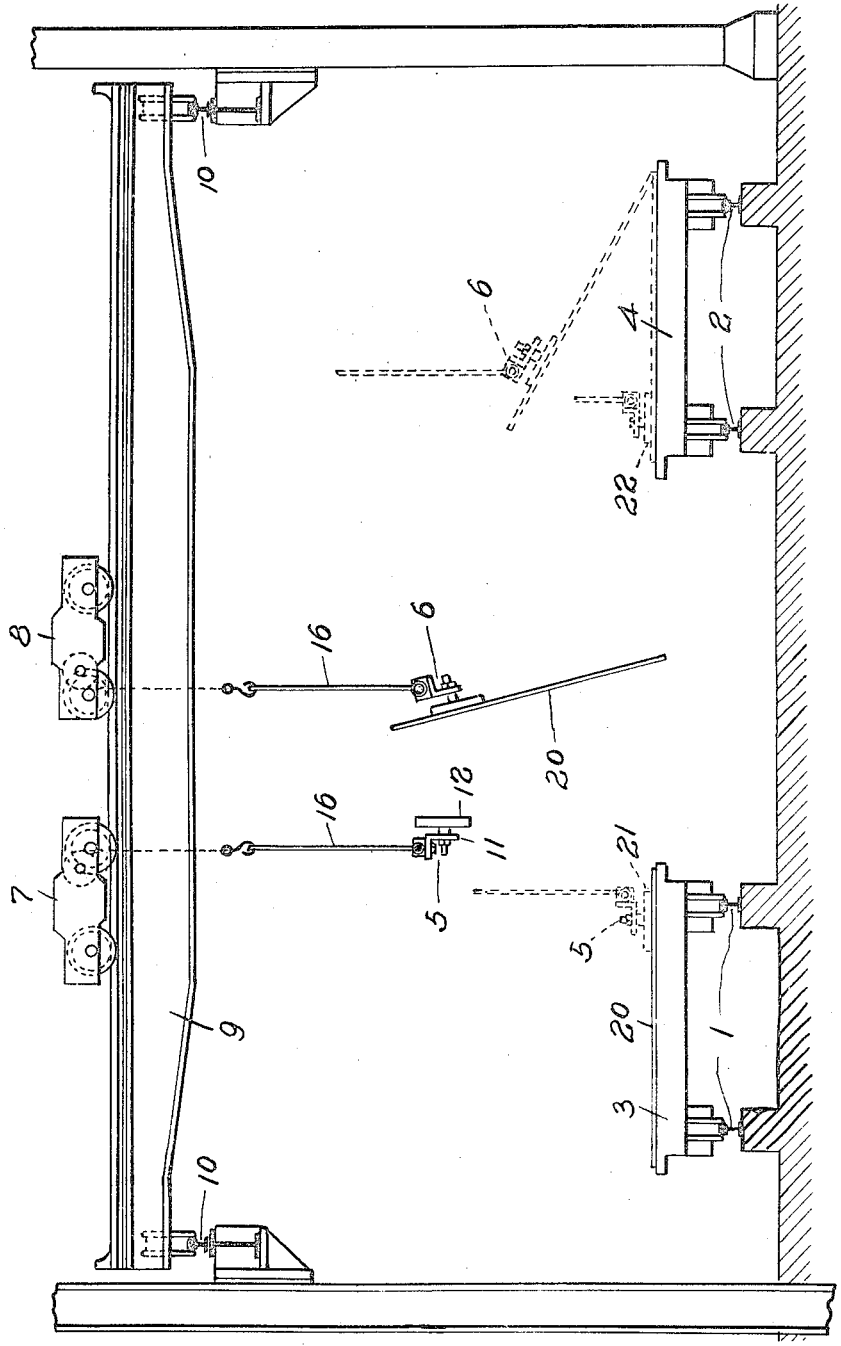

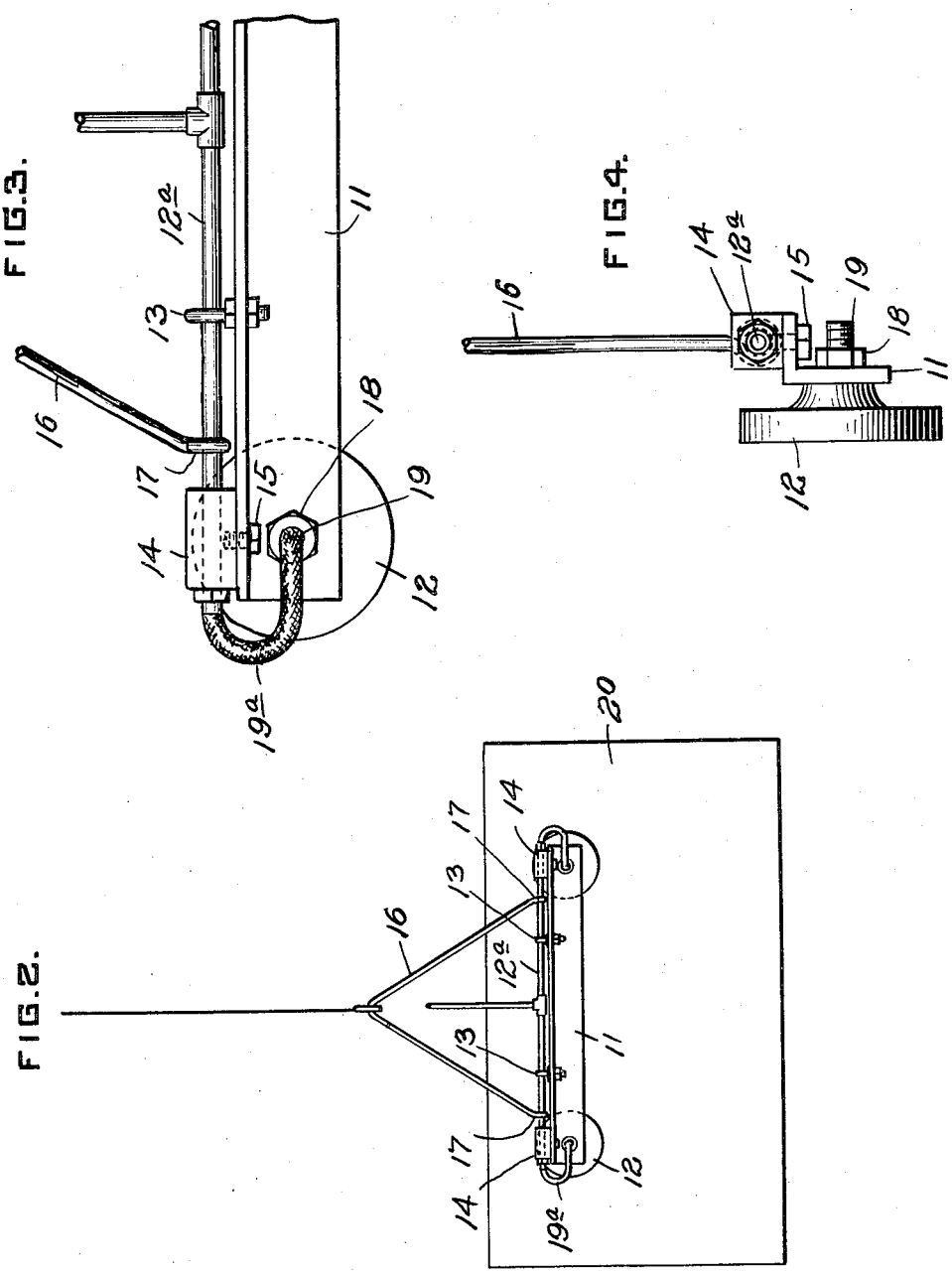

1,519,248

UNITED STATES PATENT OFFICE.

JOHN H. FOX, OF PITTSBURGH, PENNSYLVANIA, ASSIGNOR TO PITTSBURGH PLATE GLASS COMPANY, A CORPORATION OF PENNSYLVANIA.

PROCESS AND APPARATUS FOR HANDLING GLASS PLATES.

Application filed December 8, 1923. Serial No. 679,349.

*To all whom it may concern:*

Be it known that I, JOHN H. FOX, a citizen of the United States, and a resident of Pittsburgh, in the county of Allegheny and State of Pennsylvania, have made a new and useful invention in Improvements in Processes and Apparatus for Handling Glass Plates, of which the following is a specification.

The invention relates to an apparatus and a process for turning over and transferring glass plates. The apparatus is designed particularly for picking up glass from one car or carrier upon a track, turning it over, carrying it to another car or carrier on the same track or on parallel track and depositing it upon such other car or carrier. The invention has for its primary objects, the provision of an improved method of procedure, which requires only very light simple apparatus and which can be easily and readily practiced, and the provision of improved apparatus for carrying out the process, which can be handled in a limited space and with a minimum amount of breakage. The preferred apparatus for practicing the process is illustrated in the accompanying drawings wherein:

Figure 1 is an end elevation of the apparatus. Fig. 2 is a side elevation. And Figs. 3 and 4 are enlarged detail views of a part of the vacuum frame, Fig. 3 being a side elevation and Fig. 4 an end elevation.

Referring to the drawings, 1 and 2 are a pair of parallel tracks upon which are mounted the cars or carriers 3 and 4 for conveying the glass sheets to be surfaced beneath a series of grinders and polishers in a straight away operation. After the glass has been surfaced on one side, it is returned on the cars 3 to the starting end of the system, and it becomes necessary to transfer the sheets of glass having their upper sides surfaced from the tables 3 to the tables 4, at the same time turning them over to bring the rough sides up.

In order to accomplish this function, a pair of vacuum frames 5 and 6 are employed supported on the trolleys 7 and 8, movable transversely of the bridge 9. The bridge 9 is in turn mounted on the rails 10 extending longitudinally of the tracks 1 and 2 so that the apparatus may be shifted along the tracks and used at any desired point.

The vacuum frames may be constructed in various ways, but as illustrated, they comprise the longitudinally extending angle bars 11 carrying the suction cups 12. The angle bar 11 is hinged to a longitudinally extending tube 12ª by means of the eye members 13 and by means of the blocks 14 through which the ends of the tube extend. The blocks are secured to the flange of the angle bar by means of the stud bolts 15. The frame is supported from above by means of the bail 16 which has its ends formed into eyes 17 which engage the tube 12. The suction cups are secured to the angle bar by means of the nuts 18 secured onto the pipes 19 extending into the cups. The air is exhausted from the cups through the tube 12 connected to the pipes 19 by means of the flexible tubes 19ª.

In carrying out the process, the vacuum frame is lowered from its trolley so that the two cups engage the sheet of glass 20 adjacent one edge as indicated in dotted lines at 21 in Fig. 1. The frame is then raised lifting the sheet of glass about its left hand edge on the car, after which the glass is lifted free from the table, the frame at this time being moved to the position indicated by the frame 5 in Fig. 1. The other frame 6 is then made to approach the sheet of glass and engage it with its suction cups, after which the suction cups on the frame 5 are released leaving the plate supported upon the frame 6 as indicated in Fig. 1. The trolley 8 is then moved into position over the car 4 and the sheet of glass lowered so that its edge engages the right hand side of the table 4, after which the sheet is lowered by tilting it around such edge until the frame arrives at the position indicated by the dotted lines 22 (Fig. 1) when the cups are released, thus completing the operation.

What I claim is:

1. In combination in apparatus for transferring a glass sheet from one car or carrier to another car or carrier and turning it upside down, which comprises a pair of vacuum lifting frames supported from above so that they may be given a movement of approach and also moved laterally over the tables, and means for raising and lowering the frames, each frame being pivotally supported so that it may face either downwardly or laterally.

2. In combination in apparatus for transferring a glass sheet from one car or carrier to another car or carrier and turning it upside down, which comprises an overhead runway extending over the two cars or carriers, a pair of trolleys on the runway, a vacuum frame carried on each trolley and pivotally supported so that it may face downwardly or laterally, and means whereby the frames may be moved up and down.

3. The process of transferring a sheet of glass from one car or carrier to another car or carrier and turning it upside down, which consists in engaging the upper face of the sheet by suction adjacent one edge thereof, lifting the sheet from the car or carrier on which it is supported and allowing it to assume a vertical position, engaging the sheet by suction on its other surface in opposition to the first suction engagement, releasing such first engagement, and lowering the sheet upon the other car or carrier and allowing it to swing by gravity from said vertical position to a horizontal position.

In testimony whereof, I have hereunto subscribed my name this 7th day of Dec., 1923.

JOHN H. FOX.